3,120,554
SUBSTITUTED ALKYL HALOPHENYL
CARBONATES
Joseph W. Baker, Kirkwood, and Raymond E. Stenseth, Webster Groves, Mo., assignors to Monsanto Chemical Company, St. Louis, Mo., a corporation of Delaware
No Drawing. Filed May 18, 1962, Ser. No. 195,982
13 Claims. (Cl. 260—463)

This invention relates to a novel class of substituted alkyl halophenyl carbonates. More particularly, this invention is concerned with a class of new organic compounds which are cyano or nitroalkyl halophenyl carbonates. Such carbonates are found to possess useful and unexpected biological activity.

The novel compounds of this invention have the general formula

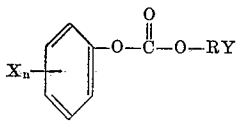

where X is selected from a group consisting of chlorine and bromine, $n$ is an integer from 2 to 5, R is alkyl containing from 2 to 4 carbon atoms, and Y is selected from a group consisting of CN and $NO_2$.

As illustrative of RY, but not limitative thereof, are 2-nitroethyl, 2-nitropropyl, 3-nitropropyl, 2-nitrobutyl, 3-nitrobutyl, 4-nitrobutyl, 2-cyanoethyl, 2-cyanopropyl, 3-cyanopropyl, 2-cyanobutyl, 3-cyanobutyl, 4-cyanobutyl, etc. and the various nitro or cyano substituted alkyl isomers containing from 2 to 4 carbon atoms (excluding the cyano carbon atom).

This novel class of compounds can be prepared by causing a halophenyl chloroformate to react with a cyano or nitro containing alcohol to produce the desired cyanoalkyl or nitroalkyl halophenyl carbonate. In such reactions, it is preferred to add a tertiary amine to the reaction mixture to serve as an acceptor for the hydrogen chloride formed during the reaction. Examples of tertiary amines which can be used are quinaldine, triethylamine, dimethylaniline, diethylaniline, pyridine, and the like. Examples of reactions utilizing an amine acceptor yielding cyano or nitroalkyl halophenyl carbonate are as follows:

(a)
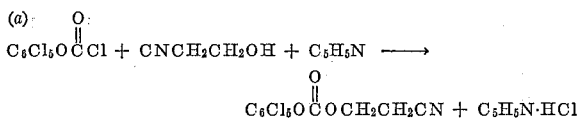

(b)
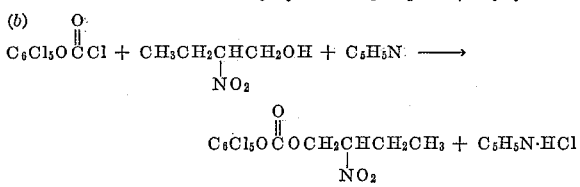

(c)
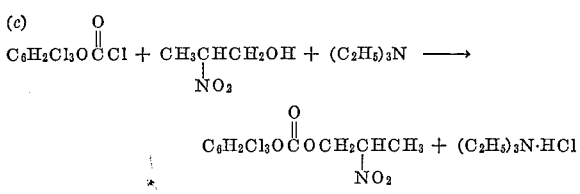

In practicing the preparation of Equations $a$, $b$ or $c$, it is also preferred to use an inert organic solvent for the chloroformate. Among the suitable solvents are benzene, toluene, xylene, hexane, heptane, octane, propyl ether, ethyl ether, tetrahydrofuran, dioxane, and the like.

The reaction temperatures employed in preparing the new compounds will depend upon the particular reactants utilized to obtain a desired end product.

It should be noted that, although both are preferred, neither the tertiary amine nor the inert organic solvent are essential to the preparation of the compounds of this invention. In absence of such amine, the hydrogen chloride which forms during the reaction can be boiled off.

The invention will be more fully understood by reference to the following examples which are set forth herein solely for the purpose of illustration and are not to be construed as limiting the scope of the present invention.

*Example I*

A suitable reaction vessel is charged with 16.4 grams (0.05 mole) of pentachlorophenyl chloroformate, 6.0 grams of 2-nitrobutanol and 150 ml. of ether. The resulting solution is cooled at 3° C. and stirred during the dropwise addition of 4.0 grams (0.05 mole) of pyridine, dissolved in 25 ml. ether, over a period of about thirty minutes. During the addition of the pyridine, the temperature is maintained between 3–4° C. The mixture is stirred at room temperature for 3 hours, filtered, and washed with ether. The filtrate and combined washings are evaporated to remove the ether, giving an essentially quantitative yield of 2-nitrobutyl phentachlorophenyl carbonate as an oily brown residue. The residue is subjected to an extraction step using Skellysolve B (an essentially n-hexane solvent having a boiling range of 60–70° C.) to yield a tan crystalline material. Recrystallization from Skellysolve B yields 0.7 gram of nearly white crystals showing with the Fisher-Johns melting point apparatus, a M.P. of 110°–112° C. Analysis shows 32.0% carbon as against 32.1% calculated for $C_{11}H_8Cl_5NO_5$.

*Example II*

A suitable reaction vessel is charged with 16.4 grams (0.05 mole) of pentachlorophenyl chloroformate, dissolved in 150 ml. of ether and 3.6 grams (0.05 mole) of 2-cyanoethanol. A solution of 4.0 grams (0.05 mole) of pyridine dissolved in 25 ml. of ether is added dropwise, with stirring, over a period of about thirty minutes. The temperature rises from 20° to 28° C. during the addition of the amine. The mixture is then stirred at room temperature for three hours. The amine hydrochloride which forms is filtered off and washed with ether. The filtrate and combined washing are evaporated to remove the ether, leaving a white solid. The white solid is dissolved in methylcyclohexane and recrystallized to yield 3.8 grams of 2-cyanoethyl pentachlorophenyl carbonate showing, with the Fisher-Johns melting point apparatus, a M.P. of 116–118° C. Analysis shows 48.8% chlorine as against 48.8% calculated for $C_{10}H_4Cl_5NO_3$.

*Example III*

In a suitable reaction vessel, 16.4 grams (0.05 mole) of pentachlorophenyl chloroformate is reacted with 4.6 grams (0.05 mole) of 2-nitroethanol according to the procedure set forth in Example I. There is obtained 2-nitroethyl pentachlorophenyl carbonate in good yield.

*Example IV*

A suitable reaction vessel is charged with 12.9 grams (0.05 mole) of 2,4,5-trichlorophenyl chloroformate, 5.9 grams (0.05 mole) of 2-methyl-2-nitro-1-propanol, and 300 ml. of ether. The reaction mixture is cooled to 5° C. A solution of 5.6 grams (0.05 mole) of triethylamine dissolved in 25 ml. ether is added dropwise, with stirring, over a period of about 40 minutes. The reaction mixture is then slowly heated to reflux temperature and held there for three hours. It is then cooled to room temperature, filtered, and washed with ether. The ether is removed from the combined filtrate and washings to give an essentially quantitative yield of crude product as a white semisolid. Recrystallization from methylcyclohexane and toluene yields 11.0 grams of 2-methyl-2-nitropropyl 2,4,5-trichlorophenyl carbonate as white crystals, M.P. 107–111° C. (Fisher-Johns melting point apparatus). Recrystallization from methylcyclohexane and toluene raises the M.P. to 123–125° C. Analysis shows 31.0% chlorine as against 31.1% calculated for $C_{11}H_{10}Cl_3NO_5$.

*Example V*

In a suitable reaction vessel, 16.4 grams (0.05 mole) of pentachlorophenyl chloroformate is reacted with 5.0 grams (0.05 mole) of 3-nitropropanol according to the procedure set forth in Example I. There is obtained 3-nitropropyl pentachlorophenyl carbonate in good yield.

*Example VI*

In a suitable reaction vessel, 14.2 grams (0.05 mole) of 2,3,4,6-tetrachlorophenyl chloroformate is reacted with 4.3 grams (0.05 mole) of 2-cyanopropanol according to the procedure set forth in Example II. There is obtained 2-cyanopropyl 2,3,4,6-tetrachlorophenyl carbonate in good yield.

*Example VII*

In a suitable reaction vessel, 19.7 grams (0.05 mole) of 2,4,6-tribromophenyl chloroformate is reacted with 6.0 grams of 2-methyl-3-nitropropanol according to the procedure set forth in Example IV. There is obtained 2-methyl-3-nitropropyl 2,4,6-tribromophenyl carbonate in good yield.

*Example VIII*

In a suitable reaction vessel, 27.6 grams (0.05 mole) of pentabromophenyl chloroformate is reacted with 3.8 grams (0.05 mole) of 2-nitroethanol according to the procedure set forth in Example I. There is obtained 2-nitroethyl pentabromophenyl carbonate in good yield.

The products of the present invention are useful as microbiocides adapted to be employed for the control of bacterial and fungal organisms. In a representative test, 2-cyanoethyl pentachlorophenyl carbonate is active against *Staphylococcus aureus* at a dilution in excess of one part per million and against *Aspergillus niger* at a dilution in excess of one part per one hundred thousand. A representative test for a nitro-containing derivative, namely 2-nitrobutyl pentachlorophenyl carbonate, shows activity against *Staphylococcus aureus* and *Aspergillus niger* at a dilution in excess of one part per one hundred thousand.

While this invention has been described with respect to certain specific embodiments, it is not so limited. It is to be understood that variations and modifications thereof may be made without departing from the spirit and scope of this invention.

What is claimed is:
1. A compound of the formula

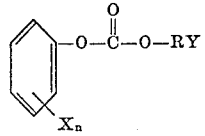

where X is selected from a group consisting of chlorine and bromine, $n$ is an integer from 2 to 5, R is alkyl containing from 2 to 4 carbon atoms, and Y is selected from a group consisting of $NO_2$ and CN.

2. A compound of the formula

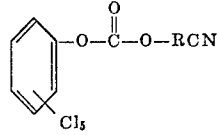

where R is alkyl containing from 2 to 4 carbon atoms.

3. A compound of the formula

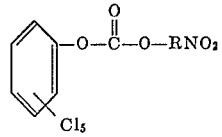

where R is alkyl containing from 2 to 4 carbon atoms.

4. A compound of the formula

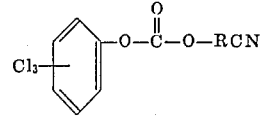

where R is alkyl containing from 2 to 4 carbon atoms.

5. A compound of the formula

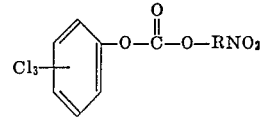

where R is alkyl containing from 2 to 4 carbon atoms.
6. 2-nitrobutyl pentachlorophenyl carbonate.
7. 2-cyanoethyl pentachlorophenyl carbonate.
8. 2-nitroethyl pentachlorophenyl carbonate.
9. 2-methyl-2-nitropropyl 2,4,5-trichlorophenyl carbonate.
10. 3-nitropropyl pentachlorophenyl carbonate.
11. 2-methyl-3-nitropropyl 2,4,6-tribromophenyl carbonate.
12. 2-nitroethyl pentabromophenyl carbonate.
13. 2-cyanopropyl 2,3,4,6-tetrachlorophenyl carbonate.

References Cited in the file of this patent
UNITED STATES PATENTS

| | | |
|---|---|---|
| 2,307,679 | Hechenbleikner | Jan. 5, 1943 |
| 2,682,527 | Dickey et al. | June 29, 1954 |